United States Patent Office 3,538,687
Patented Nov. 10, 1970

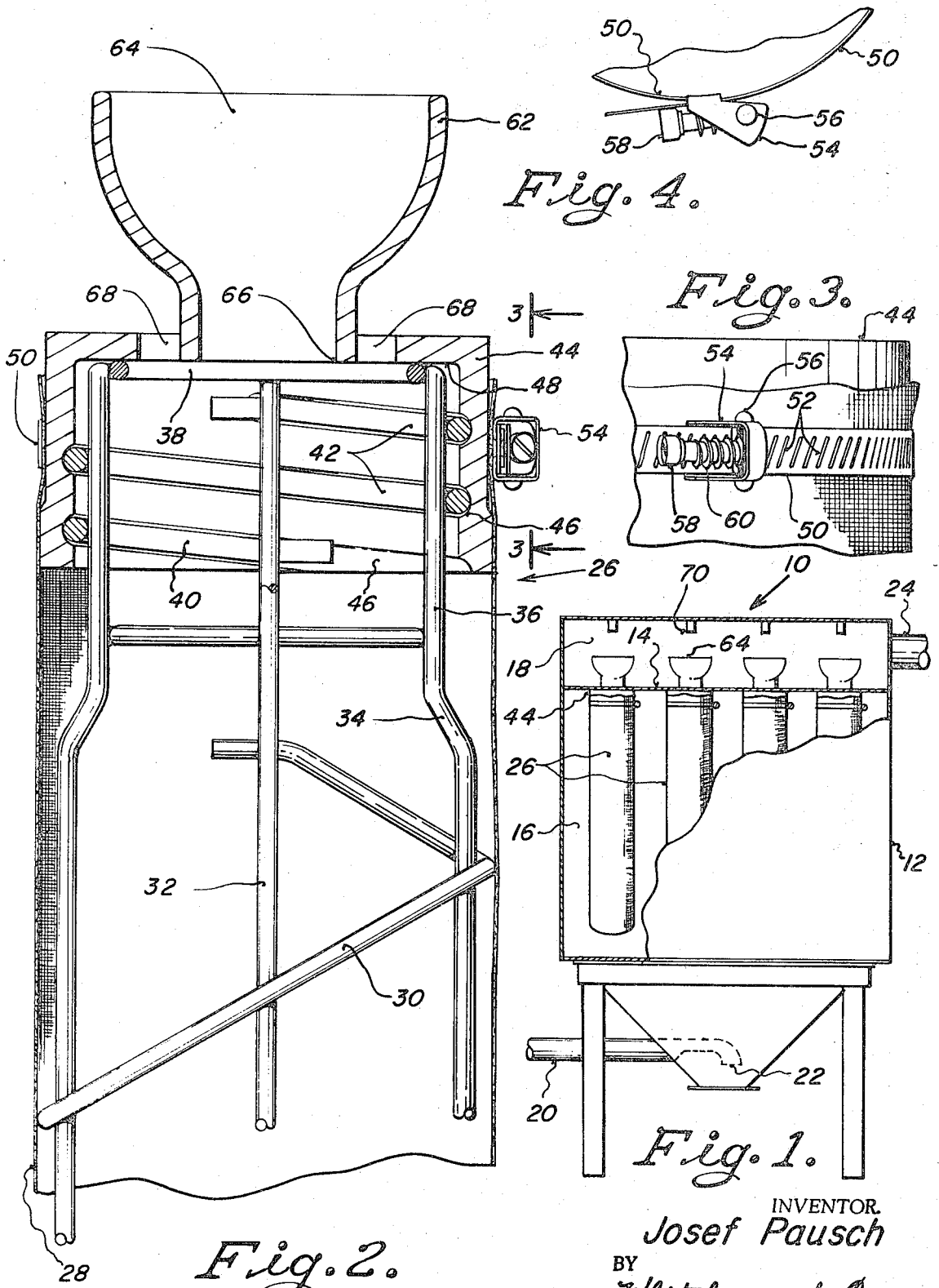

3,538,687
DEVICE FOR FILTERING SOLIDS FROM A GAS
Josef Pausch, Hopkins, Minn., assignor to Aerodyne Machinery Corporation, Hopkins, Minn.
Filed July 12, 1968, Ser. No. 744,407
Int. Cl. B01d 46/02
U.S. Cl. 55—379       1 Claim

ABSTRACT OF THE DISCLOSURE

A filtering element used for separating dust or solids from an air mixture. A cylindrical wire frame, preferably formed with a spiral strand, is adapted to be threadedly connected to the interior surface of a depending collar, either by the spiral strand forming the body of the frame, or an additional spiral strand that is wound about vertical reinforcing strands. A porous envelope circumscribes both the frame and the collar and is secured to the collar by a flexible band. The arrangement provides for easy disassembly and rotation of the envelope with respect to the remaining structure.

---

This invention relates to improvements in the construction of a device for filtering solids from a gas. In particular, it relates to means for supporting and securing a tubular porous filter element in such a manner as to increase the efficiency and life of the element and facilitate the mounting and replacement thereof in a filtering system.

In certain types of filtering operations, particularly where the quantity of solids or dust is relatively high, the porous filter element is of tubular construction and is mounted on the outer surface of a cylindrical wire frame, composed of circular bands and vertical rods joined to each other to give support to the filter element, and permit removal of the accumulated solids by "backwashing" through the interior of the cylinder with clean gas. The operation, which consists in separating solid particles from the gas, follower by the periodic abrupt action of backwashing the filter element with high energy gas, produces movement of the filter element with respect to the wire frame under diverse forces, frequently causes exessive wear of the fabric, and thus shortens the life of the filter element. Moreover, while the so-called "backwashing" will remove most of the accumulated solids that have been collected on the outer surface of the filter element, the nature or composition of some products forming the solids to be filtered, is such that it is advisable, or often necessary to periodically remove the filter elements from the structure or casing in which they are housed, so that they can be more thoroughly cleaned, as for example, by washing with solvents unders conditions capable of thoroughly cleansing the fabric forming the filter element. Because of the cramped relationship of the filter elements and their supporting members within the filtering structure, it is advantageous to provide construction whereby these parts can be readily disassembled and reassembled as a part of the replacement and cleaning operation.

An object of the invention is to provide a new mode of mounting a tubular porous filtering element in a filtering system adapted to separate solids from a gas, and in which provisions are made to facilitate the handling of the elements, in such a manner as to increase their efficiency, and also increase the period of useful life thereof.

Other and further objects may become apparent from the following specification and claims, and in the appended drawings in which:

FIG. 1 is a view in side elevation of a portion of a filtering system embodying the present invention, with parts broken away to show interior construction;

FIG. 2 is a sectional elevation of a portion of one of the filtering elements forming the present invention;

FIG. 3 is a detailed view on the line 3—3 of FIG. 2; and

FIG. 4 is a plan view of a portion of the structure shown in FIG. 3.

Referring now to the several views of the drawing, the invention will be described in detail.

Referring first to FIG. 1, general reference numeral 10 indicates in its entirety a system for filtering solids from gases in which the solids may be in a relatively high proportion. Reference numeral 12 indicates a casing that is symbolic of an industrial filtering system. The casing 12 contains a barrier 14 that divides internal area of the casing into a lower dust-air receiving chamber 16, and an upper clean-air chamber 18. The air-dust mixture to be separated is conducted into the casing 12 by a conduit 20 that projects downwardly to an enlarged outlet opening 22. The clean-air chamber 18 has projecting therefrom a discharge duct 24 that is connected to the inlet side of a fan or blower, not shown, having the effect of drawing air from the structure 10. Disposed within the interior of the dust-air receiving chamber 16 are a plurality of filtering elements, designated collectively by reference character 26.

Referring now to FIGS. 1 and 2, the elements 26 are each composed of a flexible fabric bag or "sock" 28, which is closed on its lower end and is open on its upper end. The element 28 is supported on a cylindrical skeletal wire frame composed of a spiral strand 30 that has a plurality of vertical reinforcing ribs 32. The ribs 32, towards their upper ends, are bent angularly inwardly at 34 to form a portion 36 of slightly reduced diameter, but within these limits, the rods 32 extend to an upper ring 38. Secured on the outer surface of the portion 36 of the several rods 32 is a spiral member 40 that may be a continuation of the strand 30, or it may be a separate element, but the several turns thereof, indicated at 42, are welded or otherwise secured to the rods 32 to form a spiral thread on the upper outer end of the frame member. The member 40 is adapted to fit within the interior of a tubular member 44 that forms a part of the general structure 10, and to accomplish this, the said tubular member 44 has an internal threaded portion 46 to receive the threaded portion 42 of the frame, and with the ring 38 fully contacting an interior surface 48 of the member 44.

The fabric bag or sock 28 is adapted to circumscribe the spiral strand 30 and extend up over the outer surface of the member 44, where it is clamped to the member 44 by an annular band 50.

As seen in FIGS. 3 and 4, the band 50 is formed of metal, and has a multiplicity of angularly extending slots 52 formed therein. One end of the band 50 is secured to a fastening device 54, which carries a pin 56 on which is pivotally mounted a member 58 that is provided with a spiral thread 60, and a kerf on the outer end thereof to receive the blade of a screw driver, or similar tool.

There exist several different means of "backwashing" the porous filtering elements of this general type, but for sake of illustration, in the present disclosure I have shown an element 62 carried by the member 44 and projecting through the upper surface thereof. The element 62 has as its intake end a wide opening 64 formed with an outwardly sloping radius joined to an outlet opening 66 of much smaller diameter. On either side of the element 66, member 44 contains a pair of slot-like openings 68. The element 62 is intended to be disposed below an outlet opening 70 for a high energy gas, such as compressed air, which when introduced into the inlet opening 64 of element 62 tends to induce ambient air through the interior of element 62, as well as through the slot-like openings 68.

In practical operation, a dust-air mixture, when admitted to casing 12, through the inlet conduit 20, is projected downwardly by reason of the lower opening 22 on the outer end of the conduit 20. The dust-air mixture flows upwardly through casing portion 16, because of the reduced pressure in the clean-air portion 18, and dust or other solids accumulate on the outer surfaces of the filter elements 26. The accumulated dust or other solids is periodically removed by the flow of high energy gas from the jet or outlet 70 to and through element 62. As this action occurs with substantial frequency, the fabric of the portion 28 is brought into contact with strands 30 and 32 of the skeletal frame, and under ordinary circumstances, this form of contact tends to produce excessive wear in the fabric. However, in the present invention, the bag 28 may, from time to time, be axially rotated with respect to the frame and the collar, and by reason of the spiral arrangement of the coil 30, the fabric would each time be brought into contact with different portions of the skeletal frame.

It is necessary occasionally to remove the fabric element 28 for cleaning purposes, and his is accomplished by loosening the member 58 by the application of a screw driver to the kerf thereof. The band 50 is then easily loosened, and the fabric bag removed. However, these elements are frequently located in a casing that does not permit ready access to the interior thereof, and under those circumstances, the skeletal frame being threadedly connected to the collar can be easily removed and replaced. Since the filter element 28 extends over the frame and the collar 44, and is clamped by the band 50, the element 28 can be rotated to avoid repeated contact with the same parts of the frame. Thus, a longer period of usefulness can be obtained with the porous filtering elements, and considerable time and labor can be saved in the replacement of filter elements.

The invention is defined in the terms of the appended claim.

I claim:
1. In a filtering device, in combination:
 a cup-shaped support member having an internal circular spiral groove and a flat bottom portion and formed with an aperture therein;
 a tubular skeletal frame member, having an end portion of reduced diameter, comprising a plurality of shaped axial rods arranged to define a cylindrical surface, a spiral member secured to said rods to maintain the arrangement thereof, an external circular spiral element, having the diameter and pitch of said spiral groove, secured exteriorly to said end portion, and a circular element terminating said end portion, said spiral element being threadedly inserted into and retained in said support member with the major portion of said frame member projecting beyond said support member with the outside transverse dimensions of said major portion of said frame member being substantially the same as that of said support member;
 a porous flexible filter element sized to enclose said frame member and a portion of said support member so as to be rotatably positioned on said members;
 and external gripping means for releasably securing said element to the outside of said support member.

References Cited
UNITED STATES PATENTS

| | | | |
|---|---|---|---|
| 540,720 | 6/1895 | Clark | 55—341 |
| 1,519,950 | 12/1924 | Boughan | 55—379 X |
| 1,564,178 | 12/1925 | Orem | 55—379 X |
| 3,394,532 | 7/1968 | Oetiker | 55—302 |

FOREIGN PATENTS

| | | |
|---|---|---|
| Ad. 53,617 | 1/1946 | France. |
| 896,000 | 4/1944 | France. |

DENNIS E. TALBERT JR. Primary Examiner

U.S. Cl. X.R.
55—302, 341